UNITED STATES PATENT OFFICE.

MARIAN SZUKALSKI, OF NEWTON, WISCONSIN.

MOWER ATTACHMENT

SPECIFICATION forming part of Letters Patent No. 518,430, dated April 17, 1894.

Application filed October 13, 1893. Serial No. 488,089. (No model.)

*To all whom it may concern:*

Be it known that I, MARIAN SZUKALSKI, a citizen of the United States, and a resident of Newton, in the county of Manitowoc, and in the State of Wisconsin, have invented certain new and useful Improvements in Mower Attachments; and I do hereby declare that the following is a full, clear, and exact description thereof.

My invention has for its object to provide for the cutting of peas by an ordinary mower; and it consists in certain peculiar devices attachable to such a machine and designed for the purpose of separating a swath of pea vines from the tangled mass in a field, and for elevating this swath from the ground in advance of the mower-cut, as well as for turning the cut vines and clearing them from the track of draft-animals hitched to said mower, the construction and relative arrangement of said devices, in their working positions, being hereinafter fully described with reference to the accompanying drawings and subsequently claimed.

In the drawings: Figure 1 represents a perspective view of a portion of a mower and the devices involved in my invention attached thereto; Fig. 2, a detail sectional view illustrating vine lifters that constitute part of said invention; Fig. 3, a detail front elevation partly in transverse section illustrating a connection between certain of the parts attachable to the cutting-apparatus of the mover, and Fig. 4, a diagram illustrating the disposition of fingers arranged in rear of said cutting-apparatus to turn and discharge the swath, the latter being laid clear of the track of draft-animals hitched to said mower.

Referring by letter to the drawings, A, B represent the inner and outer shoes, C the finger-bar and D the cutter bar of an ordinary mower.

Clamped to the finger-bar, in rear thereof, is another bar E having a double right-angle outer end and bolted to the higher horizontal portion of the latter bar is a plate F extended forward and downward, this plate being provided on its under side with a thimble $b$ that engages the point of the outer shoe. Held on the plate F, by the bolt that connects it with the bar E, is a standard G joined to the rearwardly extended shank $c$ of a knife H the edge of this knife being uppermost and its front end provided with an angular extension $d$ that is riveted or otherwise rigidly connected to said plate.

The means for clamping the bar E to the finger-bar is herein shown as preferably comprising bolts I arranged at intervals intermediate of said bars, and a pair of plates J on each bolt in such disposition as to bear upon the aforesaid bars from above and below the same. Engaging each bolt I above the upper clamp-plate is a plate K that extends forward and downward and is provided with a thimble $e$ for engagement with a point of one of the fingers $f$ on the bar C above specified. Fast on each plate K is a spring-metal rod L that has its front end close to the ground line and is inclined upward as it extends toward the rear.

As herein shown, the rear ends of the plates F, K, are slotted where they engage the bolts above specified in order that they may be connected to a mower regardless of the width of its finger-bar.

Bolted or otherwise rigidly secured to the bar E are a series of rearwardly extended fingers M of varying length, curvature and elevation, their disposition being such as to have the same action on pea-vines cut by the mower as a mold-board of a plow has on a slice cut from the land.

The angular extension $d$ of the knife H and the rods L lift the pea-vines from the ground in advance of a cut by said knife and mower, and as these rods are of spring-metal they will yield to any resistance in their path, while at the same time their lower ends being close to the ground or even pushing along in the soft earth under said pea vines, the latter are more certainly lifted to the desired elevation for the mower-cut. As the cut material comes onto the fingers M it is turned over to bring the under or damp side uppermost and at the (No Model.)
J. W. THEW.
STORE SERVICE APPARATUS.
No. 518,431. Patented Apr. 17, 1894.
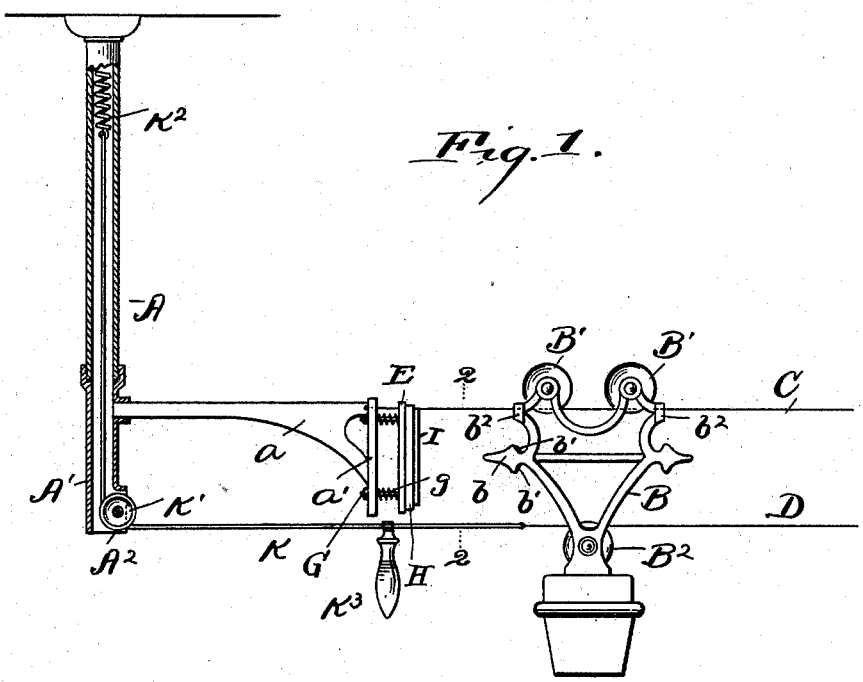
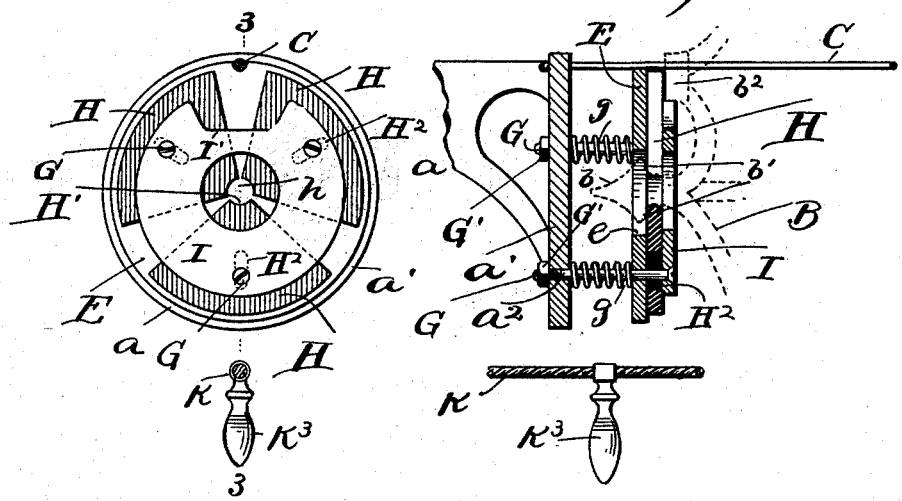

It will be seen that the knife H is in advance of the cutter-bar of the mower and the function of said knife is to separate a swath of pea-vines from the tangled mass in a field, thereby preventing tearing of said vines and loss of peas incidental to the operation of said cutter-bar.